United States Patent Office 3,376,122
Patented Apr. 2, 1968

3,376,122
METHOD OF PROTECTING THE SURFACES OF GLASS MOLDING EQUIPMENT
Joseph J. Domicone, Elmira, and Hermann L. Rittler, Horseheads, N.Y., assignors to Corning Glass Works, Corning, N.Y.. a corporation of New York
No Drawing. Filed May 20, 1965, Ser. No. 457,469
6 Claims. (Cl. 65—27)

This invention relates to a method of eliminating deposit formation and inhibiting corrosion of molding equipment resulting from contact with fluorine containing glasses.

In the automatic pressing of glass articles, a set of molds is mounted on a circular steel table which is rotated in steps. Each set consists of three parts including the mold bottom, the plunger, and the ring, which effects the closure between the other two parts. The press table is synchronized so as to receive a portion of glass of the proper volume or weight for the articles being pressed from an orifice at the bottom of the melting furnace. Thereafter, the plunger descends into the mold and presses the fluid glass to the desired shape. The glass is then partially cooled and removed from the mold. Sometimes during the molding operation deposits or corrosion form on the press mold and press plunger which substantially reduce the quality of the glass product being produced.

Generally, corrosion of the forming surfaces of glass molding equipment is not a serious problem and the equipment can be used over an extended period of time without being replaced. However, in the pressing of fluorine containing glasses condensation products and residues originating from the hot glass tend to build up on the forming surfaces. This can necessitate a shut down of equipment for the purpose of removing corrosion or deposits from the mold metal by grinding and polishing the surfaces. Not only does it result in production losses but in addition extensive grinding and polishing result in decreased mold life.

It is therefore an object of the present invention to provide a method of protecting the glass molding equipment from the action of fluorine containing glass on the forming surfaces under operational conditions.

Glass compositions which have been particularly troublesome are those containing greater than about 1 percent by weight of fluorine. Representative of these are the opal glasses, such as glass Code 6720 which is commercially available from the Corning Glass Works. Other fluorine containing compositions which have resulted in mold and plunger corrosion with resulting decrease in glass product quality are set forth in U.S. 2,651,145 issued to S. D. Stookey. As described therein, the amount of fluorine remaining in the final glass is about 1.8–3.0 percent by weight of the glass product.

In accordance with the present invention, we have discovered a method of eliminating deposits and corrosion on the forming surfaces of glass molding equipment resulting from contact with molten fluorine containing glass by applying a coating of a substantially anhydrous alcoholic solution of boric oxide to the forming surfaces under operational conditions, whereby the fluorine is converted to volatile reaction products.

The active ingredient in the treating solution is anhydrous boric oxide. At the operating temperatures of the molding equipment, the fluorine reacts with the boric oxide to form the very volatile product, boron trifluoride.

The amount of boric oxide present in the alcoholic solution is typically 2.5–15 percent by weight of the solution. It is preferred to use up to 10 percent which appear to give better results than higher concentrations. As the solubility of boric oxide may vary to some extent with the particular alcohol solvent which is being used, it is not desirable to use more boric acid than will form a saturated solution.

The solvent for the boric acid oxide should be very volatile after the solution has been applied to the surface of the molding equipment. Solvents useful for the present invention are alcohols having from 1–8 carbon atoms. These alcohols may be used alone, such as for example, methyl alcohol, propyl alcohol, amyl alcohol and octyl alcohol, or they may be used in admixtures, such as a 1 to 1 mixture of methyl alcohol and isopropyl alcohol. It is necessary that the alcohol be substantially anhydrous as the boric oxide will react with water to form metaboric acid and finally orthoboric acid. These reaction products tend to substantially reduce the effectiveness of the boric oxide and are therefore undesirable.

To properly use the novel treating solution, the mold surfaces making contact with the glass should be completely covered by the treating solution. This may be done by spraying the metal parts while the mold is in actual operation. Generally, light applications give better results than heavy applications. The sprayed pattern and the pressure under which the solution is sprayed onto the mold can be determined experimentally. However, should fluoride deposits start to build up on the plunger, especially in a nonuniform pattern, it is apparent that the spray has not completely covered the part and some adjustment of the spray may be required. It is not usually necessary to spray the plunger after each index and effective results can be obtained by intermittent treatments.

Our invention is further illustrated by the following examples:

EXAMPLES I–IV

Glass batch materials were melted in a standard glass melting tank for a period of about four to eight hours at a temperature of 1500° C. to form glass compositions which calculated from the batch in weight percent were as follows:

TABLE I

| | Ex. I | Ex. II | Ex. III | Ex. IV |
|---|---|---|---|---|
| Ingredient, percent: | | | | |
| $SiO_2$ | 70.11 | 70.32 | 70.54 | 70.96 |
| $Na_2O$ | 16.54 | 16.54 | 16.00 | 16.00 |
| $ZnO$ | 4.90 | 4.90 | 5.00 | 5.00 |
| $Al_2O_3$ | 6.69 | 6.69 | 7.00 | 6.80 |
| F | 3.02 | 2.65 | 2.50 | 2.10 |
| $CeO_2$ | 0.01 | 0.01 | 0.01 | 0.02 |
| Ag | 0.0019 | 0.0019 | 0.0020 | 0.0033 |
| Br | | | 0.27 | 1.10 |

The glass was stirred for three to four hours and the temperature was reduced to 1275° C. Then the glass was molded to form nine inch diameter free pressed plates in an apparatus consisting of a plunger and a mold. Some of the glass was also molded into tall mugs in an apparatus consisting of K-Monel mold, ring, and plunger. It was initially observed that a fluoride build up occurred on the mold and plunger surfaces within ten minutes following start up in most instances when the treating solution was not applied to the surfaces of the apparatus. However, when a 5–15 percent solution of boric oxide in N-amyl alcohol was sprayed onto the contacting surfaces of the mold and plunger, the fluoride condensate no longer continued to accumulate on the metal surfaces and as a matter of fact, disappeared entirely.

EXAMPLE V

An opal glass batch was melted to form a glass composition which calculated in weight percent from the batch had the following formulation:

TABLE II

| Ingredients: | Percent by weight |
|---|---|
| $SiO_2$ | 60.2 |
| $Na_2O$ | 8.8 |
| $K_2O$ | 2.4 |
| CaO | 4.9 |
| ZnO | 9.3 |
| $B_2O_3$ | 1.4 |
| $Al_2O_3$ | 10.4 |
| $As_2O_3$ | 0.3 |
| F | 4.2 |

In order to determine the effectiveness of the boric oxide treating solution data was obtained of the life of plungers and molds for use in pressing 10⅜ inch opal plates which was used as a control. The data taken over a period of 1½ years indicated that there had been an average plunger life of 7½ hours and an average mold life of 12½ hours before replacement for cleaning and reprocessing was required. For the present experiment, a cleaned and reprocessed plunger was installed in the press for making the opal plates. The plunger was immediately sprayed after each index with a 10 percent solution of boric oxide in a solvent of isoamyl alcohol and methyl alcohol. The sprayed solution was prepared by adding 1250 cc. of isoamyl alcohol and 950 cc. of methyl alcohol to 200 grams of boric oxide.

In order to determine if build up of the plunger was occurring, the surface of the dinner plates coming out of the mold were observed. At the end of two hours, a definite demarcation line was noticed on the surface of pressed dinner plate about three quarters of the way in from the direction of the spray. This was due to a build up on the plunger indicating the spray was not completely covering the plunger. At this time the nozzle of the spray gun was changed from the horizontal to the vertical position and the air pressure increased from 25 p.s.i. to 35 p.s.i. This resulted in a wider and deeper spray pattern. As spraying was continued, it was observed that the demarcation line began to disappear which indicated that the plunger was now completely coated with the spray solution. Longer intervals were tried such that the plunger was sprayed only after every fifth index for an additional five hours. At no time during the seven hour spray period was it necessary to wipe or clean the plunger. The appearance of the pressed dinner plates during the test with the treating solution was excellent. Thereafter the plunger was sprayed every five minutes (about 30 indexes) instead of every fifth index. It was found that by spraying the mold and plunger with the boric oxide-alcoholic solution, the plunger and mold life were increased for up to 48 hours.

We claim:

1. A method of eliminating deposits and corrosion on the forming surfaces of glass molding equipment resulting from contact with molten fluorine containing glass comprising applying a substantially anhydrous alcoholic solution of boric oxide to the forming surfaces under operational conditions whereby the fluorine is converted to volatile reaction products.

2. The method of claim 1, wherein said coating is applied by spraying said alcoholic solution substantially completely over the forming surfaces at elevated operating temperatures.

3. The method of claim 1, wherein said coating is applied intermittently between repeated molding operations.

4. A method of eliminating deposits and corrosion on the forming surfaces of glass molding equipment resulting from contact with molten fluorine containing glass comprising applying to the forming surfaces at operating temperatures a substantially anhydrous solution of boric oxide in an alcohol solvent having the formula: ROH, where R is an alkyl group having from 1–8 carbon atoms, and whereby the fluorine is converted to volatile reaction products.

5. The method of claim 4 wherein said solution contains 2.5–15 percent by weight of boric oxide.

6. A method of eliminating deposits and corrosion on the forming surfaces of glass molding equipment resulting from contact with molten fluorine containing glass comprising intermittently applying a substantially anhydrous solution of 2.5–15 percent by weight of boric oxide in amyl alcohol substantial completely over the forming surfaces under operational conditions, whereby the fluorine is converted to volatile reaction products.

References Cited

UNITED STATES PATENTS

| 2,861,897 | 11/1958 | Hendrixson | 134—31 |
| 2,930,756 | 3/1960 | Simon | 134—41 |
| 3,268,429 | 8/1966 | Farrow | 65—27 |

DONALL H. SYLVESTER, Primary Examiner.

E. R. FREEDMAN, Assistant Examiner.